US006260249B1

(12) United States Patent
Collins

(10) Patent No.: US 6,260,249 B1
(45) Date of Patent: Jul. 17, 2001

(54) MOLDING INSTALLATION DEVICE

(76) Inventor: Kenneth E. Collins, 417 E. Elm St., Winchester, IN (US) 47394

( * ) Notice: Subject to any disclaimer, the term of this patent is extended or adjusted under 35 U.S.C. 154(b) by 0 days.

(21) Appl. No.: 09/497,923

(22) Filed: Feb. 4, 2000

(51) Int. Cl.[7] .................... B23P 21/00
(52) U.S. Cl. .................... 29/235
(58) Field of Search .................... 15/230.11; 492/13, 492/19; 29/235, 243.5

(56) References Cited

U.S. PATENT DOCUMENTS

| | | | | |
|---|---|---|---|---|
| D. 323,271 | | 1/1992 | Barenthsen . | |
| 2,071,889 | | 2/1937 | Mc Glynn . | |
| 2,788,539 | * | 4/1957 | Santina | 15/230.11 |
| 2,799,884 | * | 7/1957 | Bedford | 15/230.11 |
| 3,205,526 | * | 9/1965 | Archibald | 15/230.11 |
| 3,358,312 | * | 12/1967 | Parr | 15/230.11 |
| 3,797,430 | * | 3/1974 | Boudreau | 29/243.5 |
| 3,934,341 | | 1/1976 | Carlson . | |
| 4,225,074 | | 9/1980 | Jacobson . | |
| 4,335,484 | * | 6/1982 | Ridge et al. | 15/230.11 |
| 4,608,116 | | 8/1986 | Braselton . | |
| 4,614,349 | | 9/1986 | Wenzel . | |
| 4,630,952 | * | 12/1986 | Elbaum | 15/230.11 |
| 5,035,022 | * | 7/1991 | Iuliano et al. | 15/230.11 |
| 5,068,952 | * | 12/1991 | Hennen | 29/235 |
| 5,386,611 | * | 2/1995 | Kim | 15/230.11 |
| 6,045,282 | * | 4/2000 | Begin | 15/230.11 |

* cited by examiner

*Primary Examiner*—Robert C. Watson

(57) ABSTRACT

A molding installation device for easily and conveniently installing the molding. The molding installation device includes a support member having side walls, a bottom wall, and a back wall and being arranged in a box-like structure; and also includes four bracket members securely mounted to the support member; and further includes four elongate roller members, two of which are disposed along the back wall, and two of which are disposed along the bottom wall; and a handle member attached to the side walls.

17 Claims, 2 Drawing Sheets

MOLDING INSTALLATION DEVICE

BACKGROUND OF THE INVENTION

1. Field of the Invention

The present invention relates to a cove molding roller and more particularly pertains to a new molding installation device for easily and conveniently installing the molding.

2. Description of the Prior Art

The use of cove molding roller is known in the prior art. More specifically, cove molding roller heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,614,349; 4,225,074; 4,608,116; 3,934,341; 2,071,889; and U.S. Patent No. Des. 323,271.

While these devices fulfill their respective, particular objectives and requirements, the aforementioned patents do not disclose a new molding installation device. The inventive device includes a support member having side walls, a bottom wall, and a back wall and being arranged in a box-like structure; and also includes four bracket members securely mounted to the support member; and further includes four elongate roller members, two of which are disposed along the back wall, and two of which are disposed along the bottom wall; and a handle member attached to the side walls.

In these respects, the molding installation device according to the present invention substantially departs from the conventional concepts and designs of the prior art, and in so doing provides an apparatus primarily developed for the purpose of easily and conveniently installing the molding.

SUMMARY OF THE INVENTION

In view of the foregoing disadvantages inherent in the known types of cove molding roller now present in the prior art, the present invention provides a new molding installation device construction wherein the same can be utilized for easily and conveniently installing the molding.

The general purpose of the present invention, which will be described subsequently in greater detail, is to provide a new molding installation device which has many of the advantages of the cove molding roller mentioned heretofore and many novel features that result in a new molding installation device which is not anticipated, rendered obvious, suggested, or even implied by any of the prior art cove molding roller, either alone or in any combination thereof.

To attain this, the present invention generally comprises a support member having side walls, a bottom wall, and a back wall and being arranged in a box-like structure; and also includes four bracket members securely mounted to the support member; and further includes four elongate roller members, two of which are disposed along the back wall, and two of which are disposed along the bottom wall; and a handle member attached to the side walls.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new molding installation device which has many of the advantages of the cove molding roller mentioned heretofore and many novel features that result in a new molding installation device which is not anticipated, rendered obvious, suggested, or even implied by any of the prior art cove molding roller, either alone or in any combination thereof.

It is another object of the present invention to provide a new molding installation device which may be easily and efficiently manufactured and marketed.

It is a further object of the present invention to provide a new molding installation device which is of a durable and reliable construction.

An even further object of the present invention is to provide a new molding installation device which is susceptible of a low cost of manufacture with regard to both materials and labor, and which accordingly is then susceptible of low prices of sale to the consuming public, thereby making such molding installation device economically available to the buying public.

Still yet another object of the present invention is to provide a new molding installation device which provides in the apparatuses and methods of the prior art some of the advantages thereof, while simultaneously overcoming some of the disadvantages normally associated therewith.

Still another object of the present invention is to provide a new molding installation device for easily and conveniently installing the molding.

Yet another object of the present invention is to provide a new molding installation device which includes a support member having side walls, a bottom wall, and a back wall and being arranged in a box-like structure; and also includes four bracket members securely mounted to the support member; and further includes four elongate roller members, two of which are disposed along the back wall, and two of which are disposed along the bottom wall; and a handle member attached to the side walls.

Still yet another object of the present invention is to provide a new molding installation device that allows the user to apply uniform pressure to the molding being installed.

Even still another object of the present invention is to provide a new molding installation device that saves the user a lot of time when installing the cove molding.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
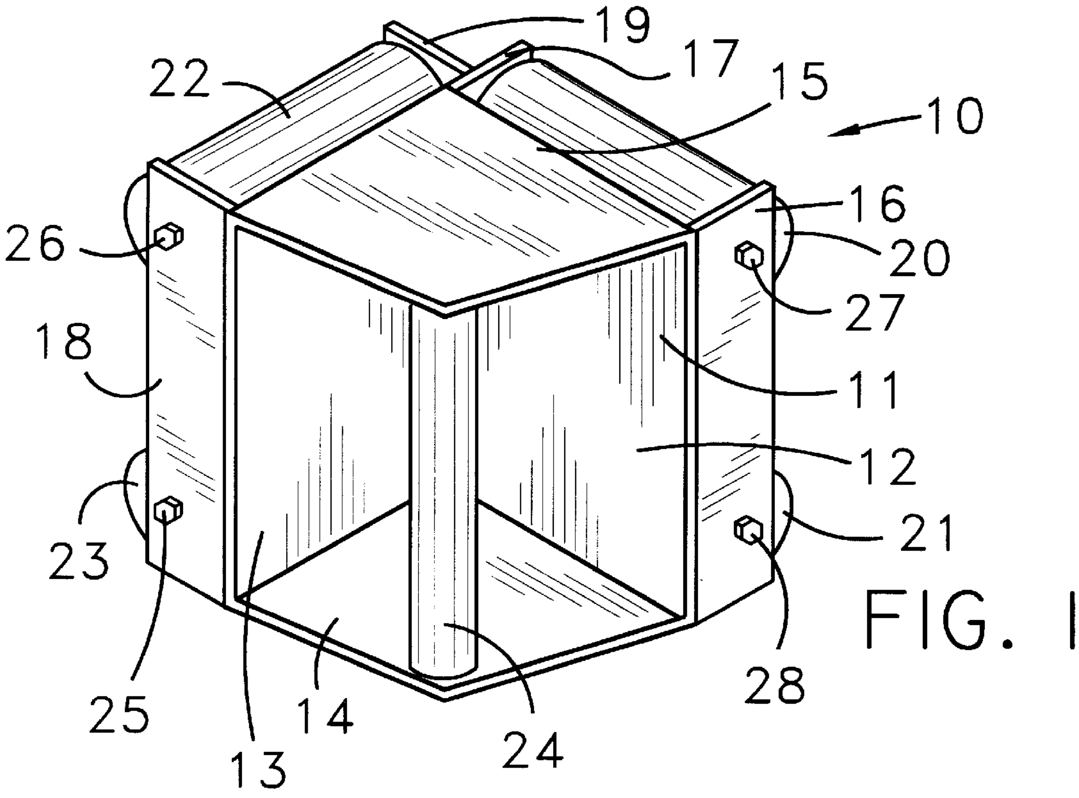
FIG. 1 is a front perspective view of a new molding installation device according to the present invention.
Figure 2:
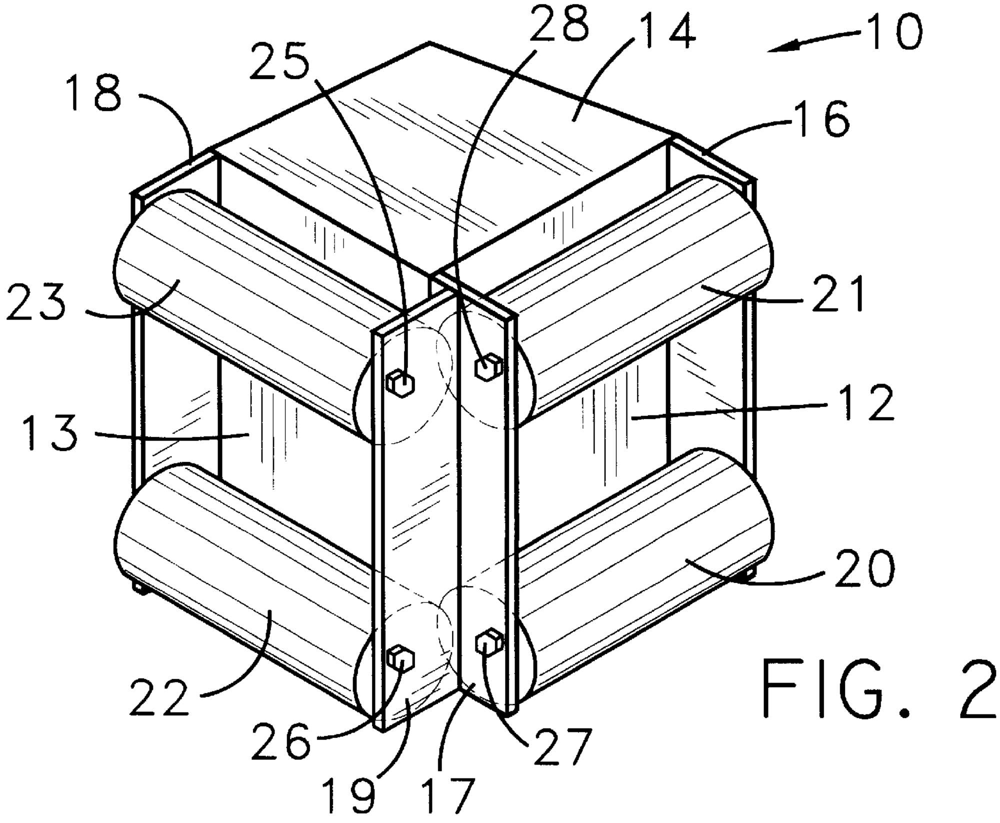
FIG. 2 is a rear perspective view of the present invention.
Figure 3:
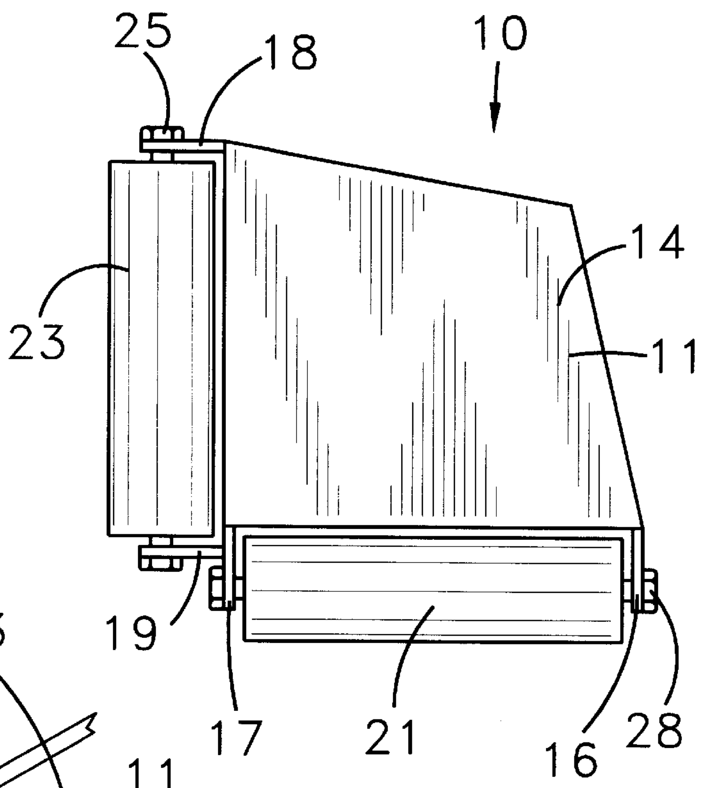
FIG. 3 is a side elevational view of the present invention.
Figure 4:
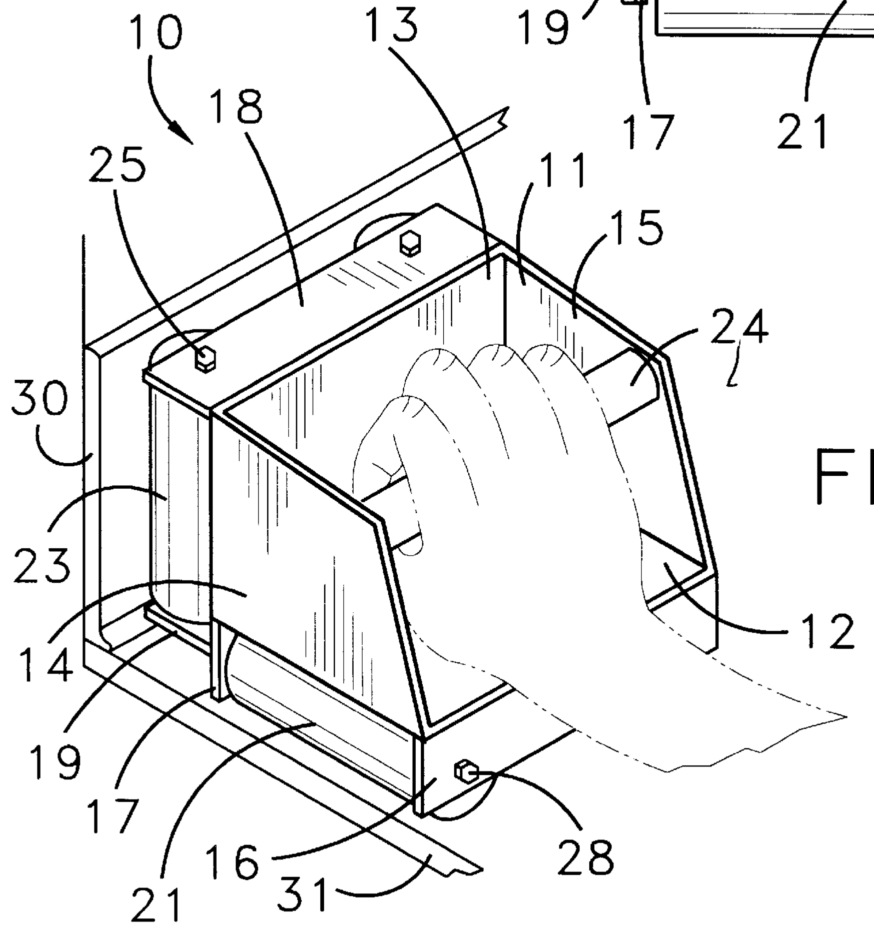
FIG. 4 is a top perspective view of the present invention actually being used.

With reference now to the drawings, and in particular to FIGS. 1 through 4 thereof, a new molding installation device embodying the principles and concepts of the present invention and generally designated by the reference numeral 10 will be described.

As best illustrated in FIGS. 1 through 4, the molding installation device 10 generally comprises a support member 11 having a bottom wall 12, a vertically-disposed back wall 13, and first and second side walls 14,15, each of which has a sloping front edge and a sloping top edge. The walls 12, 15 of the support member 11 are arranged to form a box-like structure. A plurality of mounting brackets 16–19 securely and conventionally attached to the support member 11. The bracket members 16–19 include elongate plate-like members, three 16–18 of which are securely and conventionally attached to the exteriors of the back 13 and bottom 12 walls of the support member 11 and extend outwardly therefrom, a fourth 19 of which is securely and conventionally attached to one of the three elongate plate-like members 17 and extend outwardly therefrom. A first 18 of the three plate-like members is securely attached at a top end of the back wall 13. A second 16 of the three plate-like members is securely attached at a front end of the bottom wall 12. A third 17 of the three plate-like members is securely attached at a back end of the bottom wall 12, and the fourth elongate plate-like member 19 is securely attached to the third 17 of the three plate-like members. The first 18 of the three plate-like members is disposed perpendicular to the back wall 13, and the second 16 and third 17 of the three plate-like members is disposed perpendicular to the bottom wall 12, and the fourth plate-like member 19 is disposed perpendicular to the third 17 of the three plate-like members. A plurality of roller members 20–23 is mounted to the mounting brackets 16–19. A first pair of the roller members 20,21 is rotatably mounted to the bracket members 16,17 which are mounted to the bottom wall 12, and a second pair of the roller members 22,23 is rotatably mounted to the bracket member 18 on the back wall and to the bracket member 19 mounted to another bracket member 17. The first pair of roller members 20,21 is adapted to roll upon a floor 31. The second pair of roller members 22,23 is adapted to roll upon a molding 30 with the roller members 20–23 being mounted to the bracket members 16–19 with bolts 25–28 each of which extends through a respective one of the roller members 20–23. The first pair of roller members 20,21 is disposed parallel to one another, and the second pair of roller members 22,23 is disposed parallel to one another. One of the first pair of roller members 20 including the first side wall 15 and including one of the second pair of roller members 22 all lie in a same plane, and the other of the first pair of roller members 21 including the second side wall 14 and including the other of the second pair of roller members 23 all lie in a same plane. Each of the roller members 20–23 is approximately 4 inches long and have a diameter of approximately 1 ½ inches. Each of the roller members 20–23 is made of nylon.

A handle member 24 is securely and conventionally lattached to the support member 11 with the handle member 24 being securely attached to the first 15 and second 14 side walls.

In use, the user installs molding 30, in particular, cove molding by placing the roller members 22,23 on the back wall 13 of the support member 11 against the cove molding 30 which is placed against the wall and by placing the roller members 20,21 on the bottom wall 12 upon a floor 31. The user rolls the molding installation device 10 along the surfaces which puts enough pressure on the cove molding 30 so that it adheres to the surfaces it is being applied to.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A molding installation device comprising:

a support member having a bottom wall, a vertically-disposed back wall, and first and second side walls;

a plurality of mounting brackets securely attached to said support member;

a plurality of roller members mounted to said mounting brackets; and a handle member securely attached to said support member;

wherein said walls of said support member are arranged to form a box-like structure; and wherein said mounting brackets include elongate plate-like members, three of which are securely attach ed to exteriors of said back and bottom walls of said support member and extend outwardly therefrom, a fourth of which is securely attached to one of said three elongate plate-like members and extend outwardly therefrom.

2. A molding installation device as described in claim 1, wherein a first of said three plate-like members is securely attached at a top end of said back wall, a second of said three plate-like members being securely attached at a front end of said bottom wall, a third of said three plate-like members being securely attached at a back end of said bottom wall, and said fourth elongate plate-like member being securely attached to said third of said three plate-like members.

3. A molding installation device as described in claim 2, wherein said first of said three plate-like members is disposed perpendicular to said back wall, said second and third of said three plate-like members are disposed perpendicular to said bottom wall, and said fourth plate-like member is disposed perpendicular to said third of said three plate-like members.

4. A molding installation device as described in claim 3, wherein a first pair of said roller members are rotatably mounted to said mounting brackets which are mounted to said bottom wall, and a second pair of said roller members are rotatably mounted to said mounting bracket on said back wall and to said mounting bracket mounted to another said mounting bracket, said first pair of roller members being adapted to roll upon a floor, said second pair of roller members being adapted to roll upon a molding.

5. A molding installation device as described in claim 4, further includes bolts each of which extends through a respective one of said roller members for fastening said roller members to said mounting brackets.

6. A molding installation device as described in claim 1, wherein said first pair of roller members are disposed parallel to one another, and said second pair of roller member are disposed parallel to one another.

7. A molding installation device as described in claim 6, wherein one of said first pair of roller members including said first side wall and including one of said second pair of roller members all lie in a same plane, and the other of said first pair of roller members including said second side wall and including the other of said second pair of roller members all lie in a same plane.

8. A molding installation device as described in claim 1, wherein each of said roller members is approximately 4 inches long and has a diameter of approximately 1½ inches.

9. A molding installation device as described in claim 1, wherein each of said roller members is made of nylon.

10. A molding installation device as described in claim 1, wherein said handle member is securely attached to said first and second side walls.

11. A molding installation device comprising:

a support member having a bottom wall, a vertically-disposed back wall, and first and second side walls, said walls of said support member being arranged to form a box-like structure;

a plurality of mounting brackets securely attached to said support member, said mounting brackets including elongate plate-like members, three of which are securely attached to exteriors of said back and bottom walls of said support member and extend outwardly therefrom, a fourth of which is securely attached to one of said three elongate plate-like members and extend outwardly therefrom, a first of said three plate-like members being securely attached at a top end of said back wall, a second of said three plate-like members being securely attached at a front end of said bottom wall, a third of said three plate-like members being securely attached at a back end of said bottom wall, and said fourth elongate plate-like member being securely attached to said third of said three plate-like members, said first of said three plate-like members being disposed perpendicular to said back wall, said second and third of said three plate-like members being disposed perpendicular to said bottom wall, and said fourth plate-like member being disposed perpendicular to said third of said three plate-like members;

a plurality of roller members mounted to said mounting brackets, a first pair of said roller members being rotatably mounted to said mounting brackets which are mounted to said bottom wall, and a second pair of said roller members being rotatably mounted to said mounting bracket on said back wall and to said mounting bracket mounted to another said mounting bracket, said first pair of roller members being adapted to roll upon a floor, said second pair of roller members being adapted to roll upon a molding, said roller members being mounted to said mounting brackets with bolts, said first pair of roller members being disposed parallel to one another, and said second pair of roller members being disposed parallel to, one another, one of said first pair of roller members including said first side wall and including one of said second pair of roller members all lying in a same plane, and the other of said first pair of roller members including said second side wall and including the other of said second pair of roller members all lying in a same plane, each of said roller members being approximately 4 inches long and having a diameter of approximately 1½ inches, each of said roller members being made of nylon; and a handle member securely attached to said support member, said handle member being securely attached to said first and second side walls.

12. A molding installation device comprising:

a support member having a bottom wall, a vertically-disposed back wall, and first and second side walls;

a plurality of mounting brackets securely attached to said support member;

a plurality of roller members mounted to said mounting brackets; and a handle member securely attached to said support member;

wherein a first pair of roller members are disposed parallel to one another, and a second pair of roller members are disposed parallel to one another; and wherein one of said first pair of roller members includes said first side wall and including one of said second pair of roller members all lie in a same plane, and the other of said first pair of roller members including said second side wall and including the other of said second pair of roller members all lie in a same plane.

13. The molding installation device of claim 12 wherein said walls of said support member are arranged to form a box-like structure.

14. The molding installation device of claim 12 wherein said mounting brackets include elongate plate-like members, three of which are securely attached to exteriors of said back and bottom walls of said support member and extend outwardly therefrom, a fourth of which is securely attached to one of said three elongate plate-like members and extend outwardly therefrom.

15. A molding installation device as described in claim 14, wherein a first of said three plate-like members is securely attached at a top end of said back wall, a second of said three plate-like members being securely attached at a front end of said bottom wall, a third of said three plate-like members being securely attached at a back end of said bottom wall, and said fourth elongate plate-like member being securely attached to said third of said three plate-like members.

16. A molding installation device as described in claim 15, wherein said first of said three plate-like members is disposed perpendicular to said back wall, said second and third of said three plate-like members are disposed perpendicular to said bottom wall, and said fourth plate-like member is disposed perpendicular to said third of said three plate-like members.

17. A molding installation device as described in claim 16, wherein a first pair of said roller members are rotatably mounted to said mounting brackets which are mounted to said bottom wall, and a second pair of said roller members are rotatably mounted to said mounting bracket on said back wall and to said mounting bracket mounted to another said mounting bracket, said first pair of roller members being adapted to roll upon a floor, said second pair of roller members being adapted to roll upon a molding.

* * * * *